Sept. 22, 1959  A. F. FRANCE II  2,904,889
NAVIGATIONAL INSTRUMENT
Filed June 20, 1957  2 Sheets-Sheet 1
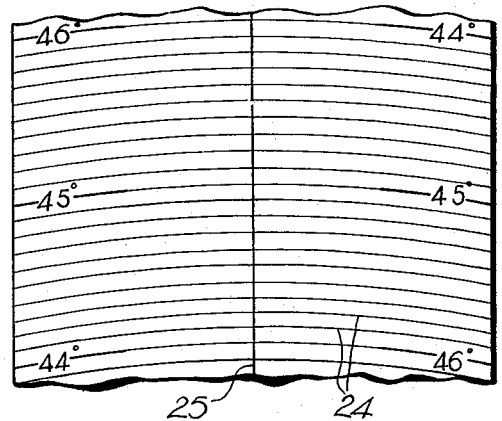
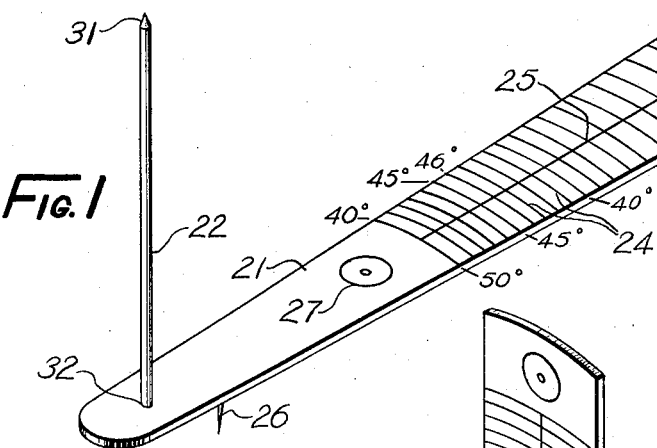
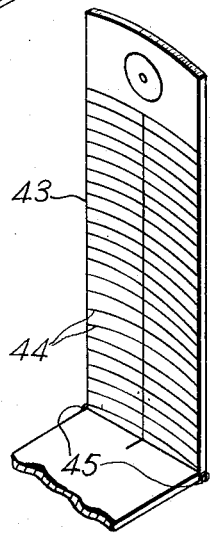
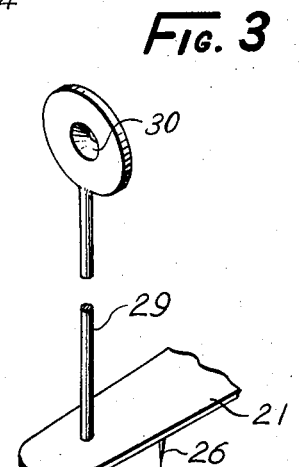
INVENTOR.
Albert F. France II
BY
Frank H. Cullen
ATTORNEY Sept. 22, 1959 A. F. FRANCE II 2,904,889
NAVIGATIONAL INSTRUMENT
Filed June 20, 1957 2 Sheets-Sheet 2

INVENTOR.
ALBERT F. FRANCE II
BY
Frank H. Cullen
ATTORNEY

United States Patent Office 2,904,889
Patented Sept. 22, 1959

2,904,889

NAVIGATIONAL INSTRUMENT

Albert F. France II, Amberley, Md., assignor to Burroughs Corporation, Detroit, Mich., a corporation of Michigan Application June 20, 1957, Serial No. 666,979

2 Claims. (Cl. 33—61)

This invention relates to a navigational instrument and more particularly to a shadow device for measuring the altitude of a celestial body.

It is known that by erecting a gnomon perpendicular to a level surface, the emitted rays of a celestial body (e.g., the sun) will cast a shadow upon the level surface. A celestial altitude measuring device of the shadow type finds application in determining one's position upon the earth provided the altitude of the body casting the shadow, can be accurately determined. By using simple trigonometric means and calibration marks placed upon the level surface, the altitude of the celestial body may be calculated. If the altitude of a celestial body, such as the sun or the moon, and the time are known, one's position upon the face of the earth may be determined.

Prior art devices of this type suffered in that the scale became too cramped for accurate readings of altitudes over 45°. To overcome this objection, the invention herein described has a scale marked surface of two sections; a first section perpendicular to the gnomon or shadow producing projection, and a second section normal to the first section. Another objection to the prior art instruments which is overcome by the present invention, lies in the necessity of directing the instrument at the celestial body so that the celestial body, gnomon, and graduated scale are all in the same plane, in order to obtain correct readings of the altitude of the celestial body. This invention employs a curved scale or curved scale graduations so that a correct reading of the altitude of a celestial body may be obtained as long as the angle formed by the intersection of the vertical plane of the celestial body and the vertical plane of the instrument does not exceed a given amount—for example 5°.

An object of this invention is to improve instruments which can be employed for the determination of one's position by the utilization of the shadow cast by a celestial body. Another object of this invention is to provide an instrument of this character which is simple in construction, light in weight, and can be carried in one's pocket.

A further object of this invention is to provide an instrument capable of accurate altitude observations for all positions of the celestial body whose altitude is being determined.

It is also an object of this invention to provide an instrument to determine the altitude of a celestial body even though the instrument is not exactly in line with the celestial body (e.g., the body, gnomon, and indicating scale not in the same vertical plane).

The invention may be better understood from the following description in conjunction with the accompanying drawings, in which:

Fig. 1 represents a perspective view of the invention;

Fig. 2 is a portion of the scale normal to the gnomon and illustrating the arcuate graduated markings on this scale;

Fig. 3 is a perspective view of another type of gnomon which may be used with the invention;

Figure 6:
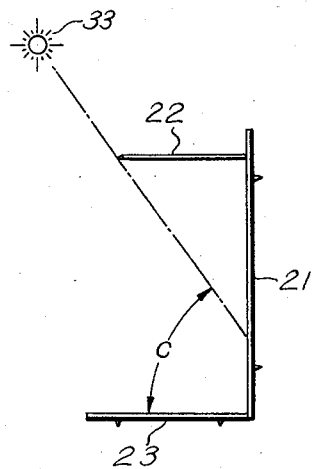
Figure 7:
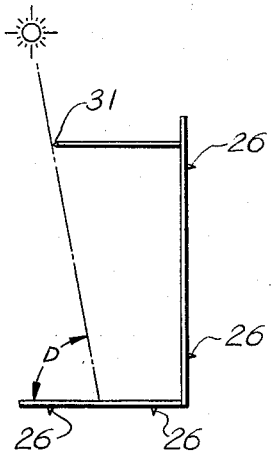

Figs. 6 and 7 similarly illustrate the position of the instrument when the celestial body whose altitude is to be determined is more than 40° from the horizon; and Fig. 8 illustrates an alternate type of base extension wherein the graduated markings are placed upon the base extension and the base extension is then rolled into a cylindrical section to obtain the desired curvature and this view also details a type of hinging between base member and base extension.

It will be seen from an inspection of Figs. 4 through 7 that there are two positions of the instrument when the altitude of the celestial body is between 40° and 50° from the horizon.

Figure 4:
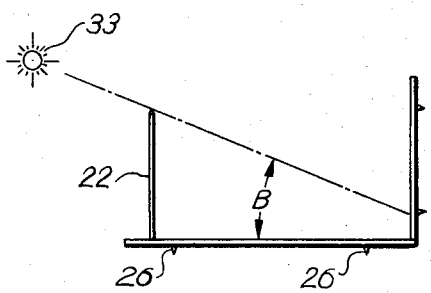
Figs. 4 and 5 illustrate the position of the instrument when the celestial body whose altitude is to be determined is less than 50° from the horizon.
Figure 5:
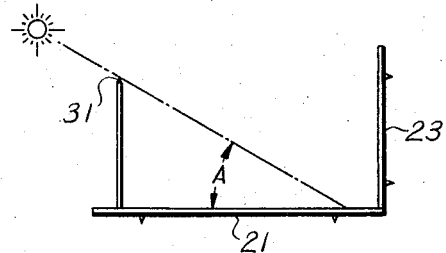

Referring now to Fig. 1, there may be seen attached at one end of a base 21, a gnomon 22, and at the other end and perpendicular to the base 21, a base extension 23. It is to be understood that proper performance of the instrument may be obtained even though the angle formed between the base 21 and the base extension 23 is an angle other than a right angle provided proper calibration of the instrument has been performed. The base 21 has inscribed upon its upper surface graduated markings 24 so arranged as to measure the angle A or C as shown in Figs. 5 and 6. The graduated markings 24 are inscribed upon the base 21 in an arcuate manner, the center of curvature for the inscribed graduated markings 24 being a point 32, which is at the base of the gnomon 22. One of the important features of the invention lies in the curved graduated markings 24 since this alleviates the necessity of directing the device at the sun in such a manner that the gnomon 22, the center line 25 of the graduated scales or markings 24 and 34 on the base 21, the base extension 23, and the sun 33 are exactly in the same plane. Similarly, the base extension 23 has inscribed upon its inner surface graduated markings 34 used to measure angle B or D as shown in Figs. 4 and 7. In this instance the base extension 23 is flat and the graduated markings 34 are inscribed upon the base extension 23 using the tip 31 of the gnomon 22 as the center of curvature.

Mounting pegs 26 are provided to push the instrument into the earth thereby providing a firmer support than if held in the hand. A bubble level 27 is mounted in the base 21 to assist the operator in placing the instrument in a level position such as shown in Figs. 4 and 5. An additional bubble level 28 is mounted in the base extension 23 to assist in placing the instrument in a level position when being used in the positions shown in Figs. 6 and 7.

Fig. 3 discloses an alternate type of gnomon 29. When the alternate type of gnomon 29 is employed, light will pass through the pinhole area 30 and a light spot within darkened areas will indicate upon the base 21 or the base extension 23, the correct altitude of the sun. When a pointed tip gnomon 22 is used, the elevation of the sun 33 is determined by the location of the tip of the shadow cast by the gnomon 22 upon the base 21 or the base extension 23.

In a prototype of the shadow device, which has been constructed and successfully operated, a 12 inch gnomon 22, and a 24 inch base 21, were used. The base extension 23 was 14 inches long with the graduated markings 34 extending from the point of intersection of the base 21 and the base extension 23 to a point 12 inches from said intersection. Below 45° this scale can be read reasonably close. At 44° to 45° it is about 0.43 inch per degree or about 3/64 inch per 6 minutes of arc. Estimates can be made of points halfway between the fine lines, or to approximately 4 minutes of arc. The distance between the graduated markings 24 is approximately the same when the vertical scale is being used and the same accuracy may be obtained. When the gnomon 21 is increased in length to 15 inches, the base 21 to 30 inches, and the base extension 23 made correspondingly longer, the scale accuracy becomes slightly over 0.5 inch per degree.

The operation of the instrument will now be described. After it is determined by observation whether the elevation of the sun 33 is more than, or less than 45° from the horizontal, the proper position of the instrument is selected. If it is determined that the sun 33 is in a position such that the angle of elevation is less than 45°, the instrument is held in a position with the base 21, parallel to the horizontal. This position is shown in Figs. 4 and 5. If it is determined that the sun 33 is in a position such that the angle of elevation is greater than 45°, the instrument is held in a position with the base 21 perpendicular to the horizontal. This places the base extension 23 in such a position as to be parallel to a horizontal plane. The correct instrument position for the sun's elevation greater than 45° is shown in Figs. 6 and 7. For elevation between 40° and 50°, either of the positions shown in Figs. 4 and 5 or 6 and 7 may be used.

For purposes of illustration we shall assume that the sun's elevation is less than 50°.

This demands that the instrument be used with the base 21 in a horizontal plane as shown in Figs. 4 and 5. To determine the elevation of the sun 33, the instrument can be held in the hands or can be set on the ground and the mounting pegs 26, pushed into the earth. The instrument is directed at the sun 33 with the gnomon 22 closest to the celestial body and with the sun 33, the gnomon 22, and the center line 25 of the base extension 23, substantially in the same plane. The instrument is now leveled by use of the base bubble level 27. With the instrument in this position, it is seen that the gnomon 22 casts a shadow on the base 21 or the base extension 23 depending upon the elevation of the sun. The elevation of the sun 33 can now be read directly from the graduated markings 24 or 34 on the base 21 or the base extension 23.

In order that no confusion may arise as to the proper scale to read, the graduated markings from zero to 50° or the scale used to determine altitudes below 50°, may be inscribed in a particular color and the corresponding colored fluid place in the base bubble level 27. Similarly, the graduated scale marking, or numbers that are used when determining altitudes over 40°, may be inscribed in another color and the corresponding colored fluid may be placed in the base extension bubble level 28.

The importance of one of the main objects of the invention may now be noted; that is, because of the arcuation of graduated markings 24 and 34 on the base 21 and the base extension 23, the correct elevation of the sun 33 can be determined without the sun 33, the gnomon 22, and the centerline 25 of the base extension 23 and the base 21 being in exactly the same plane.

If it is determined that the elevation is over 45° from the horizontal, the instrument is used with the base extension 23 parallel to the horizontal. The base 21 extends upward as shown in Figs. 6 and 7. By similar leveling using the base extension bubble lever 28, and reading the shadow cast by the gnomon 22 on the base 21 or the base extension 23 by the sun 33, the elevation of the sun 33 can be read directly from the graduated markings 24 or 34. At 44° to 45° it is about 0.43 inch per degree, or about 3/64 inch per 6 minutes of arc.

For the observed altitudes greater than 45°, the scale becomes much too cramped for close reading and, it is shown, to overcome this objection, the scale marked surface 34 of the base extension 23, is planted vertically for these higher value observed altitudes and the "lengthening shadow" effect of low altitudes then holds for high altitudes.

If the base graduated markings 24 on the base 21 were extended in one plane to take in the full range of altitudes, its length would be prohibitive—68 inches to the 10°–80° mark and to infinity for the 0°–90° mark; therefore, this base 21 is broken at 24 inches from the gnomon 22 and the scale markings carried along on another plane, or the base extension 23 mounted normal to the first plane or the base 21. Herein lies one of the important features of the invention.

Another important feature of the invention is the curvature of the graduated markings 24 and 34 on the base 21, and the base extension 23 respectively. The center of curvature for the graduated markings 24 on the base 21 can be taken from the base 32 or the tip 31 of the gnomon 22. The base extension 23 may be either a cylindrical section 43 as shown in Fig. 8 with the center of curvature measured from the gnomon 22 and the graduated markings 44 straight and in planes parallel to the plane of the base 21, or the base extension 23 may be flat and the graduated markings 34 arcuate with the center of curvature being measured from the tip 31 of the gnomon 22. As pointed out elsewhere, this curvature of the graduated markings 24 and 34 permits elevation determinations if the device is pointed within about 5° of the sun 33 or other light emitting celestial body. A table of conversions from observed altitudes to actual altitude could be marked on the unscaled portion of the base member 21.

Mounting pegs 26 are provided as shown to push into the earth, and also two bubble levels, 27 and 28. The device can be hinged in two places, at the ends of the base 21, and pins provided to lock the parts into operating position. The gnomon 22 and the mounting pegs 26 can be unscrewed or hinged. This makes it possible to fold the device into a package about 13 by 4 by 1½ inches. If made of about 3/32 inch aluminum, either ribbed or of channel cross section for rigidity, the weight is slightly over one pound.

If the gnomon 22 is increased from 12 to 15 inches and the base member 21 increased from 24 to 30 inches, a more accurate scale is provided which is slightly over ½ inch per degree. This would result in a package about 16 by 4 by 1½ inches and a weight of less than 1½ pounds.

This device is small, rugged, lightweight, has no moving parts and is reasonably accurate. If the gnomon 29 of Fig. 3 is used in place of gnomon 22, the rays of the emitting body will enter the aperture 30 and the elevation of the body will be read on the scales of the base 21 or the base extension 23, by determining the location of the spot on the graduated markings 24 or 34.

What is claimed is:

1. A device for determining the elevation of a celestial body comprising a base, a gnomon perpendicularly mounted at one end of said base, a base extension mounted perpendicular to and at the opposite end of said base, first graduated markings on said base, said graduated markings being arcuated and employing said gnomon as the center of curvature thereof, second graduated markings on said base extension, said second graduated markings in the form of arcs of circles, the center of curvature of said graduated markings being measured from the tip of said gnomon, said first graduated markings and said second graduated markings on said base and said base extension which in combination with said tip of said gnomon establish the elevation of said celestial body, mounting pegs on said base and said base extension on sides opposite to said graduated markings on said base and said base extension, a first leveling device mounted on said base to permit placing said base in a plane perpendicular to the earth, and a second leveling device mounted on said base extension to permit placing said base extension in a plane perpendicular to the earth.

2. The combination as defined in claim 1, wherein said gnomon has a pinhole aperture at its end remote from said base.

References Cited in the file of this patent

UNITED STATES PATENTS

| 728,915 | Hewitt | May 26, 1903 |
| 978,093 | Weule | Dec. 6, 1910 |
| 2,072,565 | Moehle | Mar. 2, 1937 |

FOREIGN PATENTS

| 6,805 | Germany | Aug. 28, 1879 |
| 931,161 | France | Sept. 22, 1947 |